Dec. 6, 1932. J. MILLERCHIP ET AL 1,890,124
SCREW CUTTING DIE
Filed May 11, 1932

Inventors
John Millerchip and
Thomas Morrison Lambert
By B. Singer, Atty.

Patented Dec. 6, 1932

1,890,124

UNITED STATES PATENT OFFICE

JOHN MILLERCHIP, OF LANE COVE, AND THOMAS MORRISON LAMBERT, OF ARTARMON, NEW SOUTH WALES, AUSTRALIA

SCREW CUTTING DIE

Application filed May 11, 1932, Serial No. 610,664, and in Australia May 6, 1931.

This invention relates to screw cutting dies of the type in which a set comprises separate integers which are fitted in hand operated stocks or in machine die holders or heads.

In the usual construction of dies the land is planar (in other words the teeth are straight) and is disposed at an acute angle to the cutting face so that in operation it is tangential to the work. To re-sharpen such dies the cutting face is ground, and this operation, by reducing the width of the land or length of the teeth, also materially reduces the radial depth of the die with the result that an over-size thread is cut. It is known to provide in stocks or heads means for adjustment to compensate for this reduction of radial length, but there is a limit to this adjustment and repeated grinding so reduces the radial length that the die becomes useless.

Furthermore, in the manufacture of a set of dies with straight teeth the blanks have to be very carefully set and elaborate means employed to cut the teeth so that those of each die will register properly when the set is fitted in a stock or machine head.

An object of the present invention is to provide a die which will be more serviceable and efficient than dies with straight teeth and also less liable to damage as regards the cutting points of the teeth.

A second object is to provide a die which may be resharpened in the usual way, by grinding the cutting or leading face, without reducing the radial length to the same extent that such operation would produce in a die with straight teeth, thereby prolonging the effective life of the die.

Another object of the invention is to provide a die (or a set of dies) which is more simply manufactured than those with straight teeth, the formation of the teeth being effected through the instrumentality of an ordinary screw-cutting tap, and which will still furnish the necessary clearance or relief rearwardly of the cutting edge, while having teeth of constant depth throughout their length (except as regards the usual tapered starting teeth).

These objects are achieved by the provision of eccentric relief or clearance of the cutting teeth in relation to the work. In other words the land of the die instead of being planar, is concavely curved, the curve being struck from a centre which is non-coincident with or eccentric to the centre of the work to be operated upon, or with or to the centre of the stock or machine head in which the die is mounted, as hereinafter more fully explained.

One effect of this curved or eccentric clearance is that while the cutting angle of the points of the teeth may be as required for the particular material to be operated upon, the graduated clearance of the teeth rearwardly of the points is less those of straight teeth which are tangential to the work, and in consequence the portions of the teeth rearwardly of the points, more closely engage the grooves or threads cut by the points, thus serving to resist any twisting of the dies on the work (with consequent possible damage to the points) and also producing a cleaner and smoother thread.

Moreover, the radial depth of the die does not diminish from the leading face to the trailing or rear face to the same extent as in a die with straight teeth, and consequently the grinding of the leading face does not reduce the radial depth to the same extent as does equivalent grinding of a die having straight teeth. In other words the clearance, though existent, is considerably less than that in a die having straight teeth, and this effect is produced without any sacrificing of the depth of the teeth, which is uniform throughout their length, except of course as regards the usual tapered starting teeth. A die formed according to this invention can therefore be re-sharpened many more times before becoming useless, than can the conventional die.

In the usual dies employed in hand stocks, a single die cannot be removed without disturbing the other dies of the set. A still further object of the present invention is the provision of dies any of which in a set, on account of the fastening means, may be removed without disturbing the others.

Figure 1:
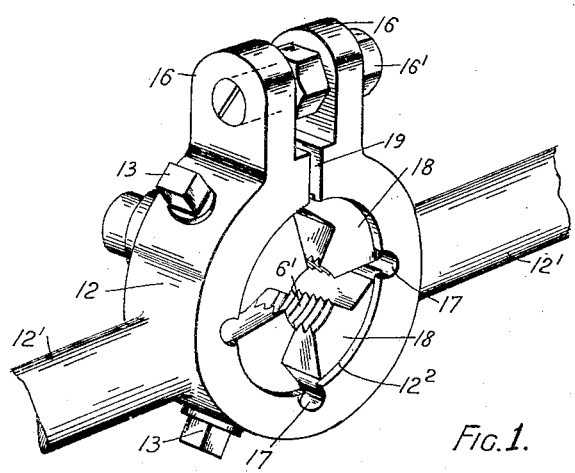
Fig. 1 is a perspective view of a stock in which the finished dies are fitted.
Figure 2:
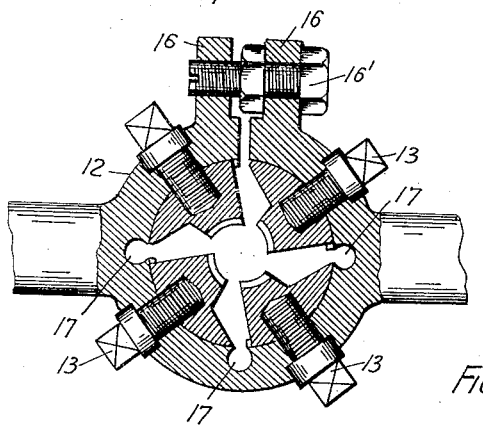
Fig. 2 is a cross-sectional elevation thereof.
Figure 3:
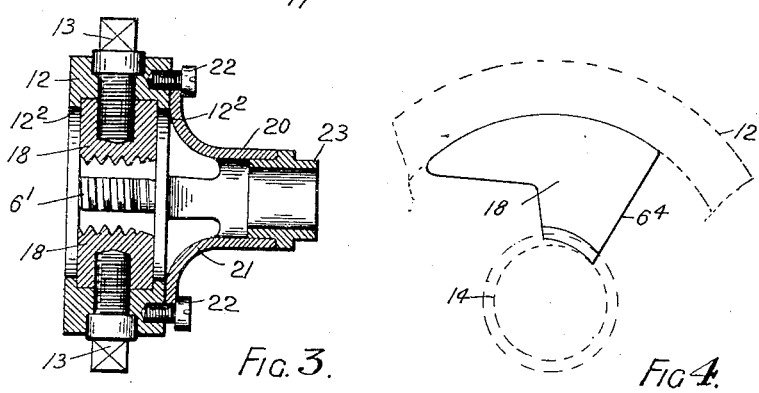
Fig. 3 is a cross-sectional elevation of the stock and dies.

A complete screw cutting tool including a set of dies, and adapted for hand operation, is shown in Figs. 1, 2 and 3. It consists in a stock comprising a short cylinder 12 equipped with radial handles $12^1$ and formed at its ends with internal annular flanges $12^2$ between which fit the dies 18 their arcuate bases fitting snugly against the wall of the cylinder. Passing radially through the cylinder wall are holding screws 13 which engage the threaded holes 5 (hereinbefore described) in the dies and serve to hold the latter in position.

To permit diametric adjustment of the cylinder it is split as at 19, and two radial lugs 16 are engaged by a pinching screw $16^1$ the adjustment of which effects the required contraction or expansion of the stock in known manner. To produce more uniform flexing of the stock, three half slots 17, spaced at 90° intervals, are provided.

Figure 4:
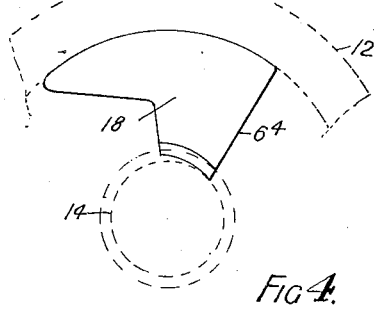
Fig. 4 is a diagram (drawn to a larger scale) clearly showing the eccentric clearance or relief of the die in relation to the work.

It will be observed that the bases or outer edges of the dies are curved to the same radius as the inner periphery of the stock, and that the lands or toothed surfaces are eccentric to the stock. This eccentricity is clearly shown in Fig. 2 and particularly in Fig. 4 in which the work is represented by circle 14, and the leading face of the die indicated at $6^4$.

It will also be noted that any single die may be removed without disturbing the others.

For centering the work there is provided a guide consisting of a collar 20 having spider arms 21 secured by screws 22 to the stock. A removable ferrule 23 of appropriate diameter to the work in hand is fitted in the collar 20.

What we claim and desire to secure by Letters Patent is:

A screw cutting tool, comprising a circular stock having a radial slot on one side by which it is split, and an adjusting screw passing through and connecting the split portions, said stock being further provided on the inner side with notches, one opposite the slot and the others intermediate said notch and said slot and dividing the stock into sections, and a set of dies each having a convex arcuate base and a concavely curved land or toothed surface eccentric to the base, each die being arranged in the stock with its convex base bearing against one section thereof and in contact with said section throughout its entire length and concentric with the inner cylindrical surface of the stock and a radial screw releasably securing each die in the stock and passing through the stock and engaging a threaded bore in the die.

Signed at Sydney, New South Wales, Australia this eighth day of April, A. D. 1932.

JOHN MILLERCHIP.
THOMAS MORRISON LAMBERT.